(12) United States Patent
Heitzmann et al.

(10) Patent No.: US 12,036,837 B2
(45) Date of Patent: Jul. 16, 2024

(54) SYSTEMS AND METHODS FOR RECREATIONAL VEHICLES

(71) Applicant: MORRYDE INTERNATIONAL, INC., Elkhart, IN (US)

(72) Inventors: David E. Heitzmann, Union, MI (US); Ryan Mason, Niles, MI (US); Ben Kauffman, Goshen, IN (US)

(73) Assignee: MORRYDE INTERNATIONAL, INC., Elkhart, IN (US)

( * ) Notice: Subject to any disclaimer, the term of this patent is extended or adjusted under 35 U.S.C. 154(b) by 0 days.

(21) Appl. No.: 17/949,435

(22) Filed: Sep. 21, 2022

(65) Prior Publication Data
US 2023/0092680 A1    Mar. 23, 2023

Related U.S. Application Data

(60) Provisional application No. 63/246,614, filed on Sep. 21, 2021.

(51) Int. Cl.
| | |
|---|---|
| *B60G 17/017* | (2006.01) |
| *B60G 17/015* | (2006.01) |
| *B60S 9/02* | (2006.01) |
| *G07C 5/08* | (2006.01) |

(52) U.S. Cl.
CPC ....... *B60G 17/017* (2013.01); *B60G 17/0155* (2013.01); *B60S 9/02* (2013.01); *G07C 5/0825* (2013.01); *B60G 2300/04* (2013.01)

(58) Field of Classification Search
CPC .............. B60G 2300/04; B60G 17/017; B60G 17/0155; B60S 9/02
USPC ....................................................... 280/6.153
See application file for complete search history.

(56) References Cited

U.S. PATENT DOCUMENTS

| | | | |
|---|---|---|---|
| 4,061,309 A | 12/1977 | Hanser | |
| 4,084,830 A | 4/1978 | Daniel, Jr. et al. | |
| 4,165,861 A | 8/1979 | Hanser | |
| 4,418,737 A * | 12/1983 | Goodell | ............ B60C 23/00363 |
| | | | 137/625.68 |

(Continued)

FOREIGN PATENT DOCUMENTS

| | | | | |
|---|---|---|---|---|
| FR | 2755402 A1 * | 5/1998 | .......... B60G 17/005 |
| WO | WO-2018085649 A1 * | 5/2018 | ................ B60S 9/02 |

OTHER PUBLICATIONS

Gandolfi, May 1998, FR-2755402-A1, Machine Translation of Specifiation.*

*Primary Examiner* — Amy R Weisberg
*Assistant Examiner* — Matthew Joseph Ganci
(74) *Attorney, Agent, or Firm* — MARSHALL, GERSTEIN & BORUN LLP

(57) ABSTRACT

A recreational vehicle includes a frame, left and right air suspensions, a front jack, a tilt sensor configured to measure lateral and longitudinal tilt data associated with the frame, and a controller. The controller is configured to receive the lateral and longitudinal tilt data to thereby level the frame laterally via operation of the left and right air suspensions and level the frame longitudinally via operation of the left and right air suspensions and the front jack. Methods for performing a leveling operation include utilizing left and right air suspensions of the recreational vehicle in combination with operating a front jack of the recreational vehicle until the recreational vehicle is level along lateral and longitudinal axes.

29 Claims, 7 Drawing Sheets

(56) References Cited

U.S. PATENT DOCUMENTS

| | | | |
|---|---|---|---|
| 4,597,584 A | 7/1986 | Hanser | |
| 4,743,037 A | 5/1988 | Hanser | |
| 4,746,133 A | 5/1988 | Hanser et al. | |
| 5,143,386 A * | 9/1992 | Uriarte | B60S 9/02 180/41 |
| 5,176,391 A * | 1/1993 | Schneider | B60S 9/12 180/41 |
| 5,188,379 A * | 2/1993 | Krause | B60S 9/12 254/423 |
| 5,312,119 A * | 5/1994 | Schneider | B60S 9/12 280/765.1 |
| 5,628,521 A | 5/1997 | Schneider et al. | |
| 6,050,573 A | 4/2000 | Kunz | |
| 6,494,487 B1 | 12/2002 | Nebel | |
| 6,584,385 B1 | 6/2003 | Ford et al. | |
| 6,619,693 B1 | 9/2003 | Sproatt et al. | |
| 6,768,936 B2 | 7/2004 | Fiorletta et al. | |
| 6,848,693 B2 | 2/2005 | Schneider | |
| 6,885,924 B2 | 4/2005 | Ford et al. | |
| 7,025,361 B1 | 4/2006 | Erickson | |
| 7,066,474 B2 | 6/2006 | Hiebert et al. | |
| 7,193,381 B2 | 3/2007 | Ford et al. | |
| 7,199,534 B2 | 4/2007 | Ford et al. | |
| 7,208,896 B2 | 4/2007 | Ford et al. | |
| 7,226,057 B2 | 6/2007 | Eichhorn et al. | |
| 7,249,754 B2 | 7/2007 | Garceau et al. | |
| 7,261,304 B2 * | 8/2007 | Trudeau | B60G 17/0155 280/5.514 |
| 7,294,797 B2 | 11/2007 | Erickson | |
| 7,296,784 B2 | 11/2007 | Peter | |
| 7,617,018 B2 | 11/2009 | Ford et al. | |
| D620,402 S | 7/2010 | Schwindaman et al. | |
| 8,181,937 B2 | 5/2012 | Schwindaman et al. | |
| 8,215,673 B2 | 7/2012 | Ford et al. | |
| 8,690,128 B1 | 4/2014 | Schwindaman et al. | |
| 9,050,947 B2 | 6/2015 | Geates | |
| 9,073,516 B2 | 7/2015 | Schwindaman et al. | |
| 9,156,441 B2 | 10/2015 | Tiedge | |
| 10,072,945 B1 | 9/2018 | McGuire | |
| 10,167,178 B2 | 1/2019 | Nebel | |
| 10,343,653 B1 * | 7/2019 | Garceau | G01C 9/08 |
| 10,427,654 B2 | 10/2019 | Garceau | |
| 10,870,325 B2 | 12/2020 | Coombs et al. | |
| 11,052,878 B2 | 7/2021 | Kinder et al. | |
| 11,091,130 B2 | 8/2021 | Garceau | |
| 2003/0135312 A1 * | 7/2003 | Ford | B60G 17/0161 180/41 |
| 2004/0178587 A1 | 9/2004 | Hiebert et al. | |
| 2005/0161891 A1 * | 7/2005 | Trudeau | B60G 17/018 280/6.155 |
| 2007/0120334 A1 * | 5/2007 | Holbrook | B60G 17/016 280/5.514 |
| 2008/0142768 A1 | 6/2008 | Thorpe et al. | |
| 2016/0272035 A1 * | 9/2016 | Oishi | B60G 17/017 |
| 2017/0124095 A1 | 5/2017 | Diederich et al. | |
| 2018/0127249 A1 | 5/2018 | Collin et al. | |
| 2019/0007950 A1 | 1/2019 | Negus et al. | |
| 2019/0193506 A1 | 6/2019 | Coombs et al. | |
| 2021/0061040 A1 * | 3/2021 | Coombs | B60G 17/019 |
| 2021/0178847 A1 * | 6/2021 | Hein | B60G 17/0155 |

* cited by examiner

SYSTEMS AND METHODS FOR RECREATIONAL VEHICLES

CROSS-REFERENCE TO RELATED APPLICATION

This application claims the priority benefit of U.S. Provisional Application No. 63/246,614, filed Sep. 21, 2021, which is hereby incorporated by reference in its entirety.

BACKGROUND

Traditionally, trailer-type vehicles can use a system of jacks to lift the vehicle to a level state for stationary use. Thereafter, the vehicles can be stabilized in the lifted, level state. Unfortunately, because a system of jacks requires that the vehicle be lifted away from the ground for leveling, ingress and egress from the vehicle is made more difficult and the center of gravity of the vehicle is higher from the ground, potentially making it more unstable.

SUMMARY

In accordance with a first aspect, a recreational vehicle is disclosed that includes a frame, left and right air suspensions coupled to the frame, a front jack coupled to the frame, a tilt sensor configured to measure lateral and longitudinal tilt data associated with the frame, and a controller. The controller is configured to receive the lateral and longitudinal tilt data to thereby level the frame laterally via operation of the left and right air suspensions and level the frame longitudinally via operation of the left and right air suspensions and the front jack.

In some implementations, the controller is configured to lower a higher one of the left and right air suspensions to level the frame laterally and lower the front jack to level the frame longitudinally. If desired, the controller can further be configured to lower the left and right air suspensions after the frame is leveled laterally.

In some implementations, the recreational vehicle can include one or more stabilizers coupled to the frame, and the controller can be configured to lower the one or more stabilizers after the frame is leveled laterally and longitudinally to hold the frame in a desired attitude. In further implementations, the one or more stabilizers can include one or more of: one or more front stabilizers coupled to a front portion of the frame, one or more intermediate stabilizers coupled to an intermediate portion of the frame, and one or more rear stabilizers coupled to a rear portion of the frame.

In some implementations, the recreational vehicle can include a compressor fluidly connected to the left and right air suspensions via valves. With this configuration, the controller can be configured to raise the left and right air suspensions by operating the valves to supply compressed air from the compressor and lower the left and right air suspensions by exhausting air therefrom. In further implementations, the recreational vehicle can include an offboard port fluidly coupled to the compressor. In additional implementations, the recreational vehicle can include left and right tires fluidly coupled to the compressor via valves and tire pressure monitoring sensors. With this configuration, the controller can be configured to selectively inflate the left and right tires by operating the valves to supply compressed air from the compressor and/or deflate the left and right tires.

In any of the above implementations, the recreational vehicle can include a warning light visible to a user, where the controller is configured to illuminate the warning light in response to identifying a fault in operation; and/or a system interface that includes a user input allowing a user to instruct the control system to level the recreation vehicle.

In accordance with a second aspect, a method for operating a recreational vehicle is disclosed that includes performing a leveling operation. The leveling operation includes lowering left and right air suspensions to a low setting, leveling the left and right air suspensions to level the recreational vehicle along a lateral axis, and operating a front jack of the recreational vehicle until the recreational vehicle is level along a longitudinal axis.

In some implementations, the method can include one or more of the following aspects: performing the leveling operation can include performing a leveling operation with a controller based on data from a tilt sensor; lowering the left and right air suspensions to the low setting can include lowering the left and right air suspensions to a lowest set pressure or height; leveling the left and right air suspensions to level the recreational vehicle along the lateral axis can include determining a lower one of the left and right air suspensions of the recreational vehicle relative to a horizontal plane and raising the lower one of the left and right air suspensions until the recreational vehicle is level along the lateral axis; or the method can include raising the left and right air suspensions to level the recreational vehicle along the longitudinal axis in response to determining that a lowest setting of the front jack does not level the recreational vehicle along the longitudinal axis.

In some implementations, the method can include lowering one or more stabilizers to lock the attitude of the recreational vehicle with the recreational vehicle level along the lateral and longitudinal axes. In further implementations, the method can include performing a support retraction operation including retracting the one or more stabilizers to a storage position. In yet further implementations, the support retraction operation can include one or more of: raising at least one of the left and right air suspensions or the front jack a level sufficient to lower or remove a force applied to the stabilizers due to the stabilizers supporting the recreational vehicle, setting the left and right suspensions to a desired ride height for travel, or raising the front jack to a hitch height.

In accordance with a third aspect, a method for operating a recreational vehicle is disclosed that includes performing a leveling operation. The leveling operation includes determining a higher one of left and right air suspensions of the recreational vehicle relative to a horizontal plane, lowering the higher one of the left and right air suspensions until the recreational vehicle is level along a lateral axis, and operating a front jack of the recreational vehicle until the recreational vehicle is level along a longitudinal axis.

In some implementations, the method can include, after the recreational vehicle is leveled along the lateral axis, lowering the attitude of the recreational vehicle by lowering both the left and right air suspensions. In further implementations, lowering the attitude of the recreational vehicle can include lowering the left and right air suspensions until the recreational vehicle is at a lowest possible level attitude corresponding to one or both of the left and right suspensions bottoming out.

In some implementations, the method can include raising the left and right air suspensions to level the recreational vehicle along the longitudinal axis in response to determining that a lowest setting of the front jack does not level the recreational vehicle along the longitudinal axis.

In some implementations, the method can include lowering one or more stabilizers to lock the attitude of the recreational vehicle with the recreational vehicle level along the lateral and longitudinal axes. In further implementations, the method can include performing a support retraction operation including retracting the one or more stabilizers to a storage position. In further implementations, the support retraction operation can include one or more of: raising at least one of the left and right air suspensions or the front jack a level sufficient to lower or remove a force applied to the stabilizers due to the stabilizers supporting the recreational vehicle, setting the left and right suspensions to a desired ride height for travel, or raising the front jack to a hitch height.

In any of the above implementations, performing the leveling operation can include performing a leveling operation with a controller based on data from a tilt sensor and/or first moving the left and right air suspensions and the front jack to preset levels.

DETAILED DESCRIPTION

Figure 1:
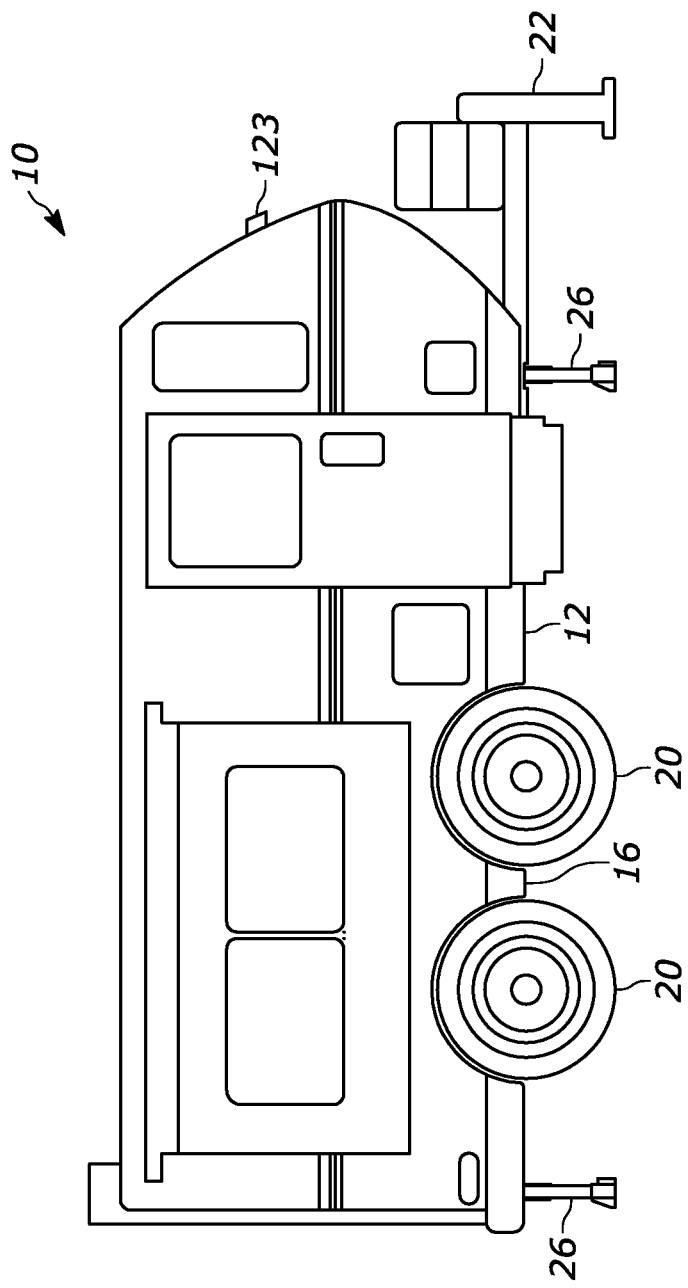
FIG. 1 is a side elevation view of a first example recreational vehicle in accordance with various embodiments.
Figure 2:
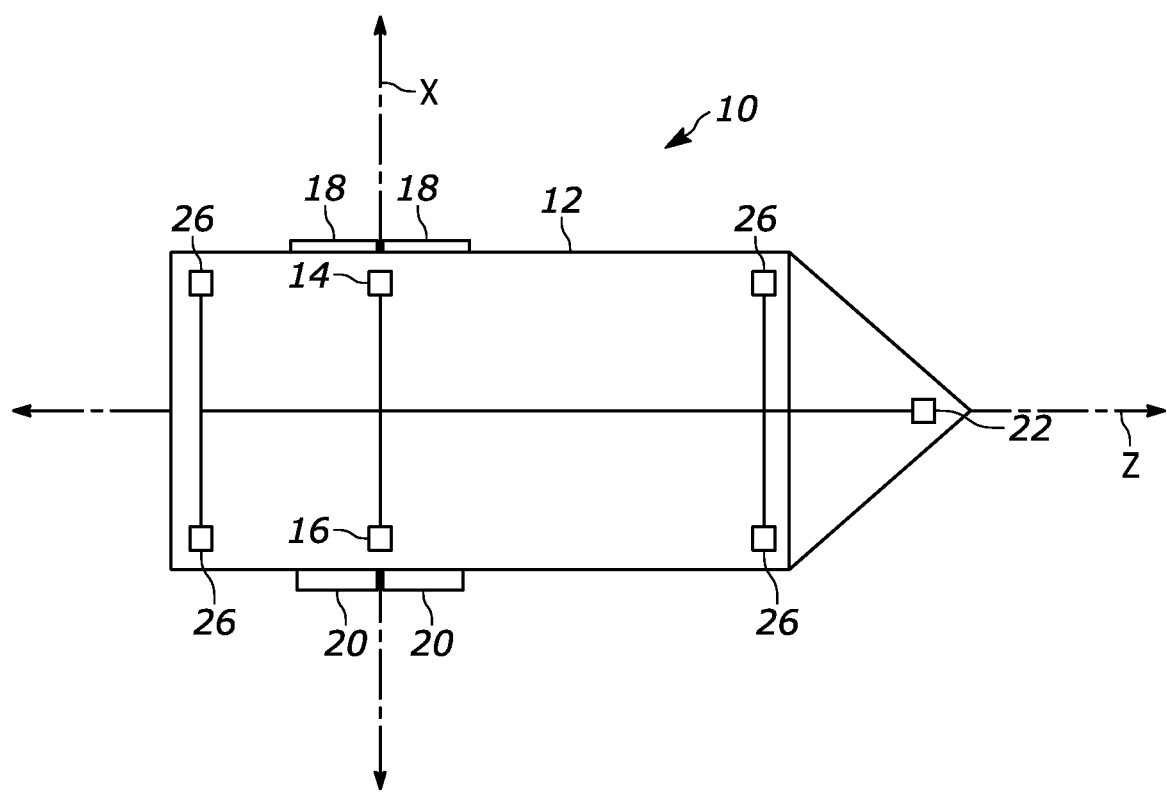
FIG. 2 is a top diagrammatic view of the recreational vehicle of FIG. 1.
Figure 3:
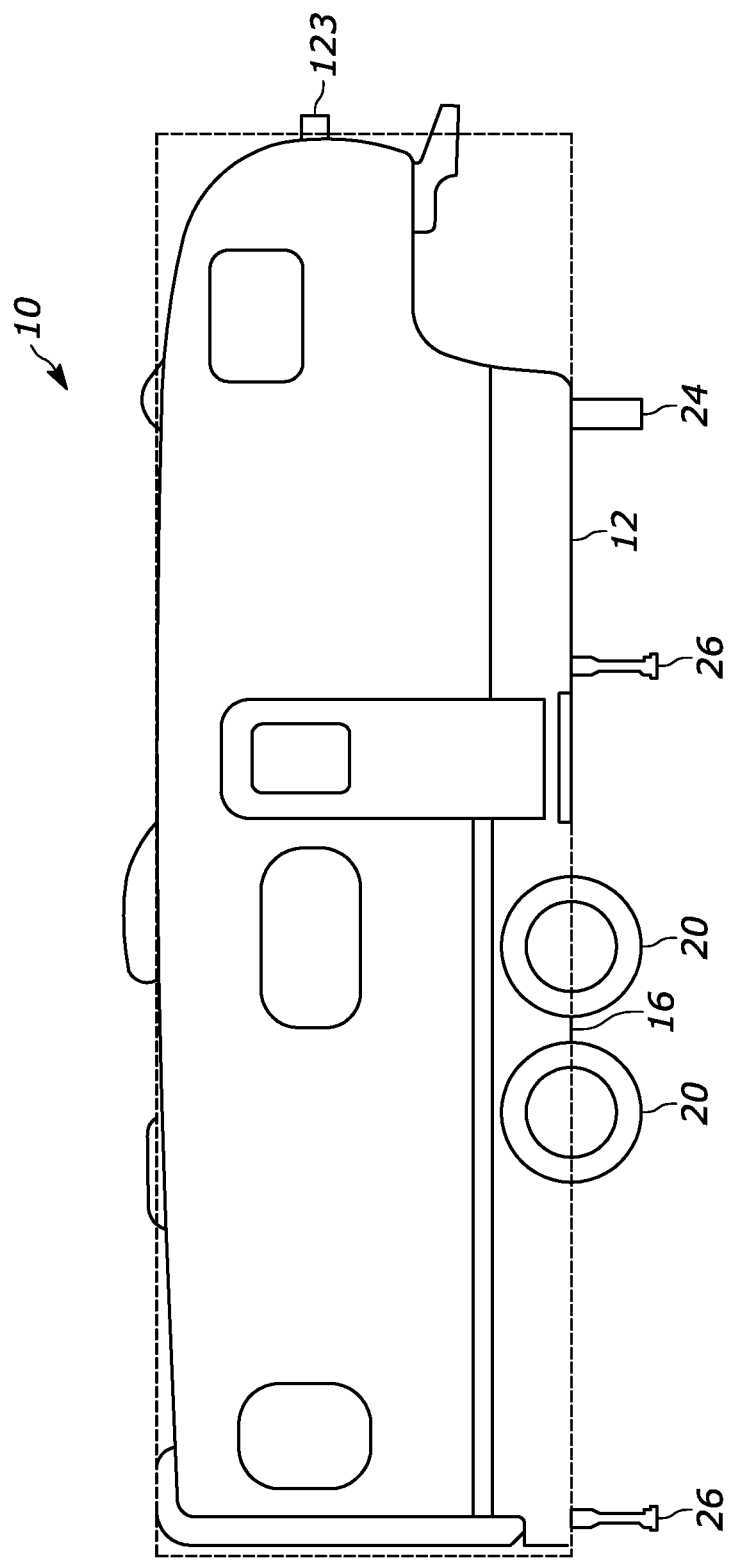
FIG. 3 is a side elevational view of a second example recreational vehicle in accordance with various embodiments.
Figure 4:
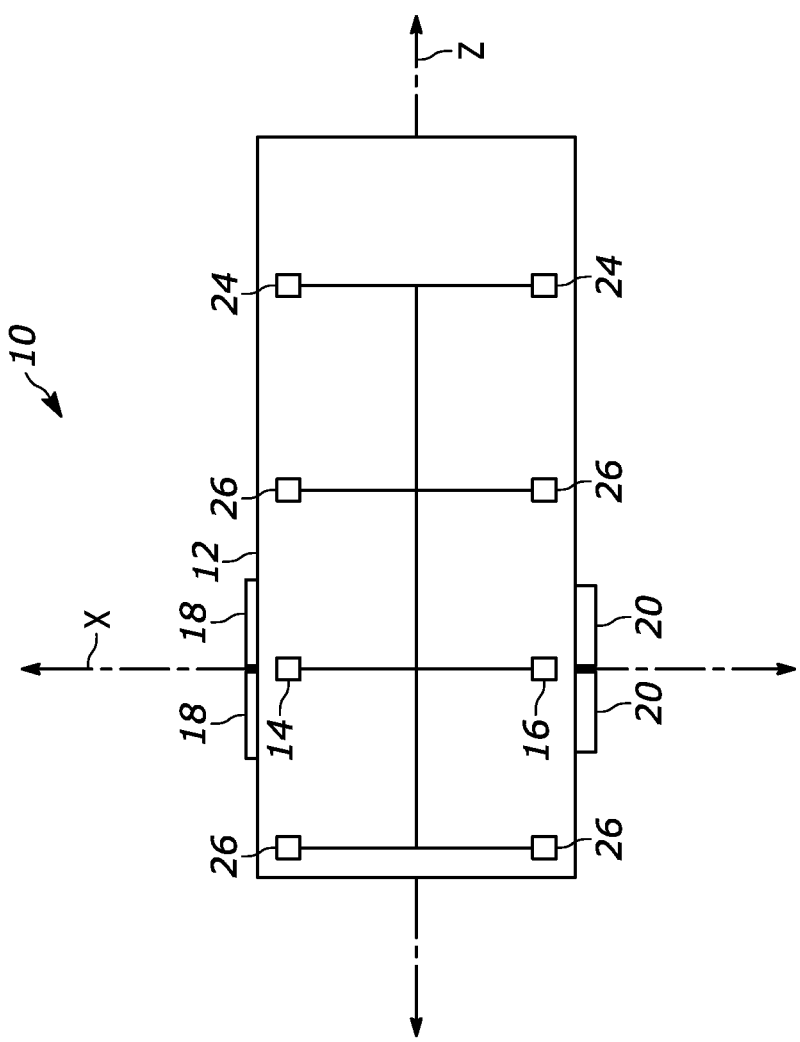
FIG. 4 is a top diagrammatic view of the recreational vehicle of FIG. 3.

Suspension systems for recreational vehicles, methods of operation for suspension systems for recreational vehicles, methods of leveling recreational vehicles, and application software ("app") for control of a suspension system and other components for recreational vehicles are described herein.

"Recreational vehicles" or "RVs" as described herein are intended to include travel trailers, fifth wheels, goosenecks, and so forth. Example RVs 10 are shown in FIGS. 1-4 that include a frame 12 with left and right air suspensions 14, 16 coupled to the frame 12 adjacent to left and right tires 18, 20. For camping or other storage uses, the RVs 10 can also include a front jack 22, suitable travel trailers for example, or landing legs 24, suitable for fifth wheels for example. Further, in some examples, the recreational vehicles 10 can include a one or more stabilizers 26 configured to extend and hold the recreational vehicle 10 in a desired attitude while stationary. In the illustrated example, the RV 10 includes front and rear stabilizers 26, which can include a single stabilizer in the front and rear of the RV 10, stabilizers disposed in corners of the RV 10, and so forth. It will be understood that the RV 10 could also include intermediate stabilizers as desired.

Figure 5:
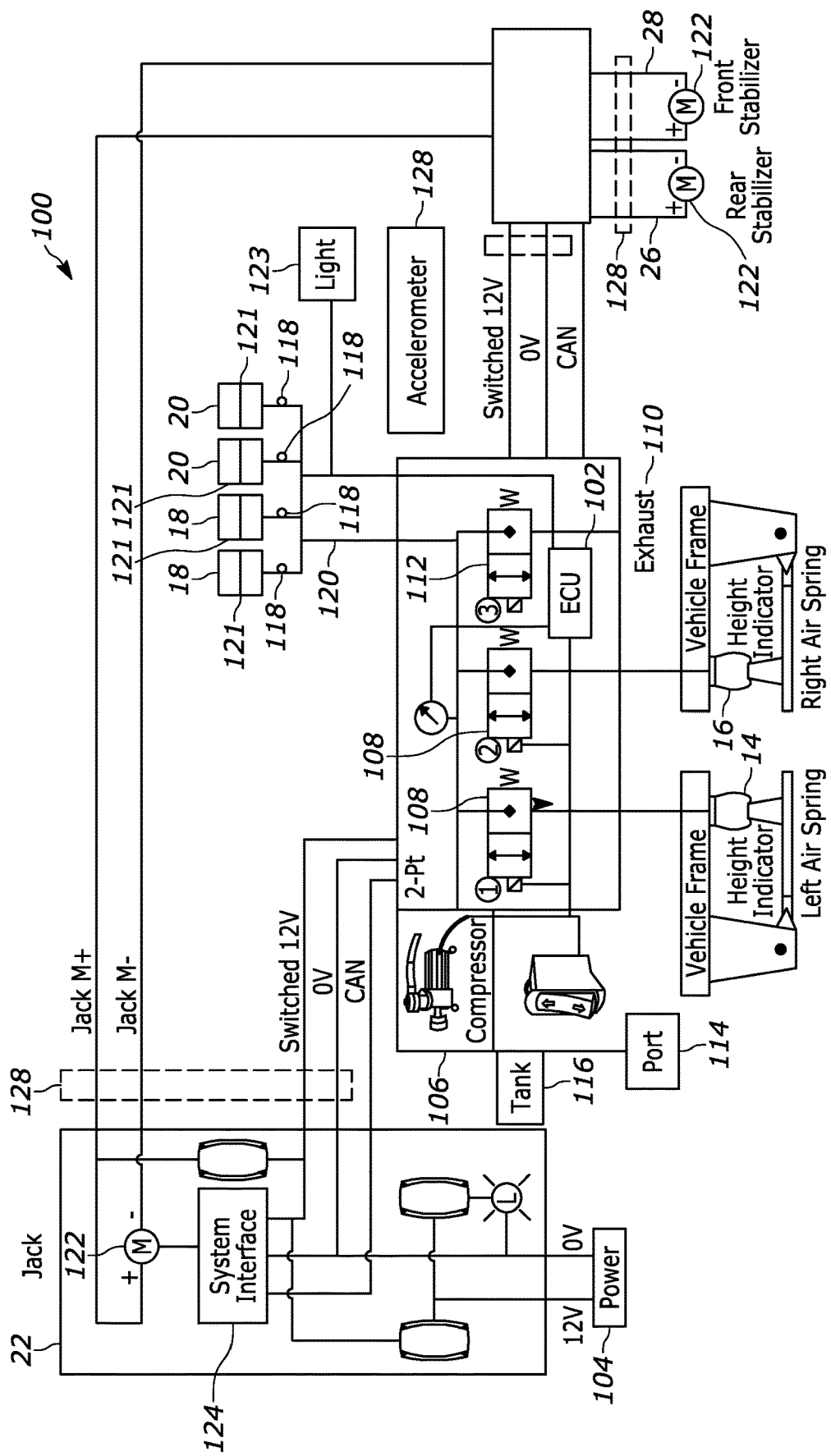
FIG. 5 is a circuit diagram for a recreational vehicle support system in accordance with various embodiments.

An example circuit diagram for a RV support system 100 is shown in FIG. 5 showing connections between the front jack 22, the left and right air suspensions 14, 16, and the stabilizers 26. The suspension system 100 of this form further includes a controller 102, a power source 104, and a compressor 106 fluidly connected to the left and right air suspensions 14, 16 via valves 108. The compressor 106 and left and right air suspensions 14, 16 are further fluidly coupled to an exhaust 110 via a valve 112. If desired, the compressor 102 can include an offboard port 114 to provide a compressed air source for exterior uses. Further, the system 100 can include a corresponding tank 116 for the compressor 102, which can be utilized to store a volume of compressed air. It will be understood that a single compressor 102 is shown, but the system 100 can include two or more compressors, as desired. For example, a separate compressor 102 can be provided for the offboard port 114.

If desired, the system 100 can also include one or more tire pressure monitoring sensors 118 and, optionally, a fluid connection 120 between the compressor 102 with corresponding valves 121 and the tires 18, 20 for selective inflation and/or deflation thereof.

As shown, each of the front jack 22 and stabilizers 26 can include a corresponding motor 122 electrically connected to the power source 104. In other examples, a single motor can operate two or more of the stabilizers 26. Additionally, whether sharing a motor or having independent motors, it will be understood that left and right pairs of stabilizers 26 can be provided in a single unit or can operate independently.

As shown, the system 100 can further include a warning light 123 disposed on the RV 10 so as to be visible to a user in the instance of a fault or other warning, as discussed below. For example, the warning light 123 can be disposed on the front of the RV 10 so as to be visible from a tow vehicle to alert a driver or passenger of potential issues.

In some examples, the system 100 includes a system interface 124 to provide user control of the components of the system 100. The interface 124 can take any suitable form, including a touch screen, switches, etc. Further, the interface 124 can be physically mounted to a structure of the RV 100, such as the front jack 22 as shown, passenger storage, an exterior surface, and so forth. Alternatively or additionally, the interface 124 can be provided by application software ("app") operating on a computing device of a user, such as a smartphone, tablet, or laptop. The interface 124 can communication with the system 100 and controller 102 thereof by can be any suitable network, such as the Internet, WiFi, radio, Bluetooth, NFC, etc. In one example as shown, the components of the system 100 can communicate with one another via a controller area network (CAN). Additionally, it will be understood that the system 100 can be a standalone system within the RV 10 or can be controlled by, integrated with, and/or communicate with other systems in the RV 10.

Figures 6, 7:
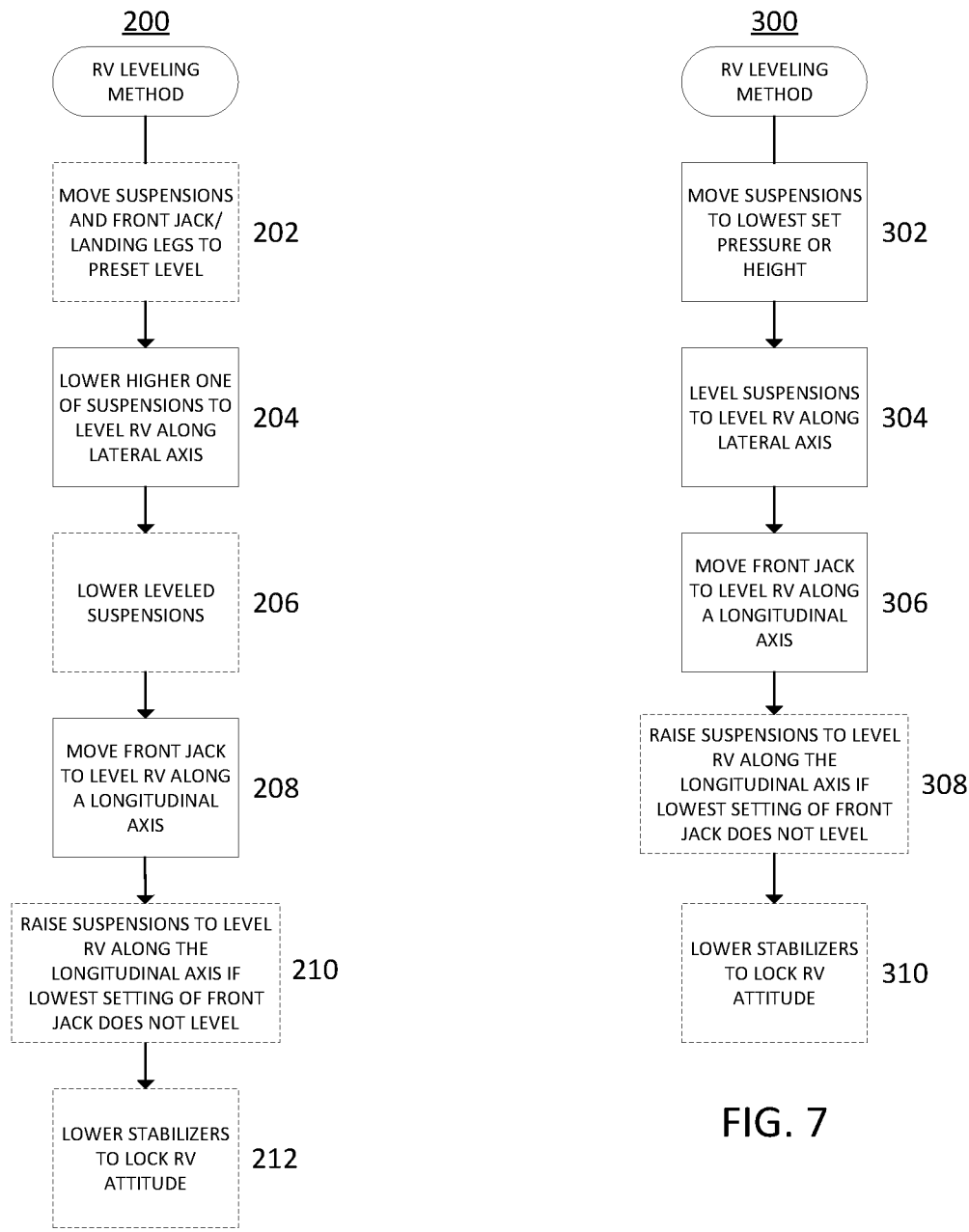
FIG. 6 is a flowchart for a first example recreational vehicle leveling method in accordance with various embodiments.
FIG. 7 is a flowchart for a second example recreational vehicle leveling method in accordance with various embodiments.

In one aspect, the system 100 can be utilized in a leveling method 200, 300 to level the RV to enter a "camp" storage mode as shown in FIGS. 6 and 7. As a result of utilizing the suspensions 14, 16 during the leveling method 200, the RV 10 can be leveled without raising the RV 10, as compared to using a system of jacks for leveling. Rather than raise the RV 10, the height of the RV 10 can be maintained or, advantageously lowered, utilizing the system 100 herein. This allows the RV 10 to sit lower after leveling, making it easier to get in and out and potentially more stable. As shown in FIG. 5, the system 100 can include an accelerometer or other suitable tilt sensor 126 coupled to the RV 10 to measure a lateral and longitudinal tilt thereof and transmit tilt data to the controller 102.

A first example method 200 is shown in FIG. 6. In an optional first step 202, the suspensions 14, 16 and the front jack 22 are moved to a preset level. In a second step 204, a higher one of the suspensions 14, 16, determined by the controller 102 based on data from the accelerometer 126, lowers to level the RV 10 along a lateral axis X. Then, in an optional third step 206, both of the suspensions 14, 16 lower to lower the attitude of the RV, while maintaining the RV 10 in a level attitude along the lateral axis X. By one approach, in the third step 206, the suspensions 14, 16 can lower to a lowest possible level attitude for the RV 10 corresponding to one or both of the suspensions 14, 16 bottoming out. By lowering the RV 10 to the lowest possible level attitude, a user is provided with the easiest ingress and egress, as well as providing for the best possible stability for the RV while in "camp" mode. In a fourth step 208, the front jack 22 moves, e.g., raises or lowers, to level the RV 10 along a longitudinal axis Z determined by the controller 102 based on data from the accelerometer 126. This advantageously provides an automatic leveling method for the RV 10 that also corresponds to a lowest possible point given the configuration of the suspensions 14, 16. While the above steps will level the RV 10 in most situations, in the event lowering the front jack 22 to its lowest or otherwise predetermined low setting does not level the RV 10 along the longitudinal axis Z, in an optional fifth step 210, the method can include raising the suspensions 14, 16 until the RV 10 is leveled along the longitudinal axis Z according to the lowest or otherwise predetermined low setting of the front jack 22. Finally, in an optional sixth step 212, the stabilizers 26 lower to lock the RV 10 in the level position.

Figure 8:
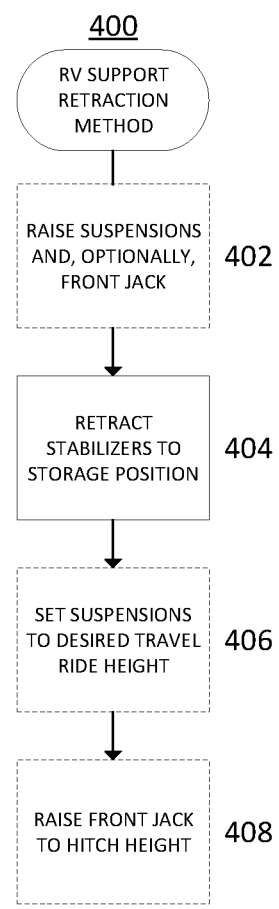
FIG. 8 is a flowchart for a recreational vehicle support retraction method in accordance with various embodiments.

A second example method 300 is shown in FIG. 7. In a first step 302, the suspensions 14, 16 are moved to a lowest set pressure or a lowest height. The lowest set pressure/lowest height can be any desired setting. For example, the lowest set pressure/lowest height can correspond to the frame being supported on the bump stop or equivalent structure of the suspension(s) 14, 16. In a second step 304, the RV 10 is leveled along the lateral axis X. For example, this can entail raising a lower one of the suspensions 14, 16, determined by the controller 102 based on data from the accelerometer 126, to level the RV 10 along the lateral axis X. Then, in a third step 306, the front jack 22 moves, e.g., raises or lowers, to level the RV 10 along the longitudinal axis Z determined by the controller 102 based on data from the accelerometer 126. This advantageously provides an automatic leveling method for the RV 10 that also corresponds to a lowest possible point given the configuration of the suspensions 14, 16. While the above steps will level the RV 10 in most situations, in the event lowering the front jack 22 to its lowest or otherwise predetermined low setting does not level the RV 10 along the longitudinal axis Z, in an optional fourth step 308, the method can include raising the suspensions 14, 16 until the RV 10 is leveled along the longitudinal axis Z according to the lowest or otherwise predetermined low setting of the front jack 22. Finally, in an optional fifth step 310, the stabilizers 26 lower to lock the RV 10 in the level position In another aspect, the system 100 can also be utilized in a support retraction method 400 as shown in FIG. 8 to allow the RV 10 to be moved. In an optional first step 402, the suspensions 14, 16 and, if desired, the front jack 22 raise to a level sufficient to lower or remove a force applied to the stabilizers 26 due to the stabilizers 26 supporting the RV 10 on the ground. Thereafter, in a second step 404, the stabilizers 26 retract to a storage position. Finally, in an optional third step 406, the suspensions 14, 16 can be set to a desired height, preset or otherwise, for travel and, in an optional fourth step 408, the front jack 22 can be raised to hitch height.

The system 100 can also include features for determining a fault during operation of the front jack 22 or landing legs 24. In one example, the system can determine if the front jack 22 or one or both of the landing legs 24 run out of stroke before a longitudinal leveling is achieved by the controller 102 determining that the RV 10 is not longitudinally level based on data from the accelerometer 126 after a predetermined amount of time has passed. In another example, the controller 102 can determine that the RV 10 is not longitudinally level based on a signal received from a limit set on the jack 22/landing legs 24. The limit can be set at the stroke limit or a predetermined distance therefrom, such as about, e.g. +/−0.25 inches. 0.5 inch, 1 inch, and so forth. The limit can take any suitable form, including limit switches, hall effect sensors, current/power monitoring, etc. The controller 102 can be configured to send a message to the user through the interface 124 and/or illuminate the warning light 123 in response to determining that the front jack 22 or landing legs 24 have run out of stroke or that the RV 10 is not level. For example, the controller 102 can cause a push notification to appear on a user computing device operating the app, discussed in more detail below.

As discussed above, in one example, the front jack 22/landing legs 24 and the stabilizers 26 can each include a dedicated motor 122. The system 100 can be configured to determine when the front jack 22/landing legs 24 and/or the stabilizers 26 have landed and/or reached a stroke limit. In one example, one or more of the front jack 22/landing legs 24 or stabilizers 26 can include a type 2 breaker 128 set to break the circuit at a predetermined current, which advantageously can be correlated to a current associated with the front jack 22, landing legs 24, and/or stabilizers 26 having landed. With this configuration, the controller 102 can monitor the circuit for a zero current to thereby determine that the front jack 22, landing legs 24, and/or stabilizers 26 have landed. As understood, the type 2 breaker 128 can be configured to reset after current has been removed. Of course, suitable alternative circuit breakers can also be used, including, for example, suitable automatic and manual circuit breakers, snap action fuses, etc. Further, other reset methods can be used, such as a cool down or a timed reset. In another example, the type 2 breaker 128 can be set to break the circuit at a current corresponding to a current associated with the front jack 22, landing legs 24, and/or stabilizers 26 having reached an extension and/or retraction stroke limit or overloaded state, and the controller 102 can be configured to monitor the current in the circuit for a determination of landing, stroke limit, and/or overloaded state. For example, the controller 102 can be configured to compare a predetermined current value known to correlate to a landed jack/leg/stabilizer and compare the predetermined current value to a current of the circuit to determine whether the front jack 22, landing legs 24, and/or stabilizers 26 have landed. Further, the controller 102 can be configured to determine that the front jack 22, landing legs 24, and/or stabilizers 26 have reached a stroke limit or an overloaded stated by determining that the current in the circuit is zero due to the type 2 breaker 128 breaking the circuit. In another example, the system 100 can utilized a timer to measure the length of an extension and/or retraction operation of the front jack 22, landing legs 24, and/or stabilizers 26 and the controller 102 can compare the length to a predetermined value corresponding to a length of time that is longer than expected for the operation. If the controller 102 determines that the length of time is longer than expected, or a fault according to any of the above examples, the controller 102 can notify the user through the interface 124, stop operation of the front jack 22, landing legs 24, and/or stabilizers 26, and/or illuminate the warning light 123. For example, the controller 102 can cause a push notification to appear on a user computing device operating the app, discussed in more detail below. It will be understood that the system 100 can utilize these approaches individually or in combinations with one another both for an overall system configuration and for the components individually.

As discussed above, the interface 124 can be provided via an app operating on a user computing device. As understood, the app may include one or more graphical user interfaces (GUIs) with example display actions operating on the computing device. The GUI(s) can include icons corresponding to desired actions for the system 100. Of course, it will be understood that any of the GUIs can be provided in different groups, as standalone software, or each of the GUIs can include icons to access the others. To select a desired action, a user can select one of the icons with a user input, such as a touch screen, button, switch, and so forth.

In one example, the app can include icons corresponding to "camp" or "travel" modes for the system 100. As discussed above, the "camp" mode can include an icon to cause the system 100 to perform the leveling method 200 or entering the "camp" mode through the GUI can cause the leveling method 200 to be automatically performed and/or cause the system 100 to ensure that the leveling method 200 was previously performed. For the "travel" mode, the app can include an icon to cause the system 100 to perform the support retraction method 300 or entered the "travel" mode can cause the retraction method 300 to be automatically performed and/or cause the system 100 to ensure that the retraction method 300 was previously performed. The app can further provide user functionality controls corresponding to whether the system 100 is in the "camp" or "travel" mode. For example, in the "travel" mode the, the app can provide a user with one or more preset ride heights for the suspensions 14, 16, which are stored in the controller 102, to account from different loads carried, or for different clearance requirements due to hills, valleys, or height impediments.

The app can also be configured to track the activity of the system, including any user inputs or measurements/instructions provided by the controller 102. The script of tracked activity can allow a user or technician to troubleshoot an issue to determine which step in the operation of the RV 10 caused the issue.

The app can also include a user-editable script or note section, which can be provided in window, separate GUI, and so forth. The note section would allow a user a convenient location to compile notes about the care or operation of the RV 10, a to-do list, etc.

The controller 102 can be configured to communicate with the interface 124 and components of the system 100 by any suitable communication network, including a CAN, a wide-area network (WAN), or a local-area network (LAN), and can include wired and/or wireless communication links. The controller 102 can include a memory, which can include persistent and non-persistent components in any suitable configuration. The term controller, as utilized herein, refers broadly to any microcontroller, computer, or processor-based device with processor, memory, and programmable input/output peripherals, which is generally designed to govern the operation of other components and devices. It is further understood to include common accompanying accessory devices, including memory, which can have persistent and non-persistent components, transceivers for communication with other components and devices, etc. These architectural options are well known and understood in the art and require no further description here. The controllers disclosed herein may be configured (for example, by using corresponding programming stored in a memory as will be well understood by those skilled in the art) to carry out one or more of the steps, actions, and/or functions described herein.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, or mechanisms. The components or mechanism may include software modules (e.g., code embodied on a machine-readable medium or in a transmission signal) and/or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

We claim:

1. A recreational vehicle comprising:
 a frame;
 left and right air suspensions operably coupled between the frame and wheels of the recreational vehicle;
 a front jack coupled to the frame;

a tilt sensor configured to measure lateral and longitudinal tilt data associated with the frame; and a controller configured to receive the lateral and longitudinal tilt data to thereby level the frame laterally via operation of the left and right air suspensions and level the frame longitudinally via operation of the left and right air suspensions and the front jack.

2. The recreational vehicle of claim 1, wherein the controller is configured to:

lower a higher one of the left and right air suspensions to level the frame laterally; and lower the front jack to level the frame longitudinally.

3. The recreational vehicle of claim 2, wherein the controller is further configured to lower the left and right air suspensions after the frame is leveled laterally.

4. The recreational vehicle of claim 1, further comprising one or more stabilizers coupled to the frame, the controller configured to lower the one or more stabilizers after the frame is leveled laterally and longitudinally to hold the frame in a desired attitude.

5. The recreational vehicle of claim 4, wherein the one or more stabilizers comprise one or more of:

one or more front stabilizers coupled to a front portion of the frame;

one or more intermediate stabilizers coupled to an intermediate portion of the frame; and one or more rear stabilizers coupled to a rear portion of the frame.

6. The recreational vehicle of claim 1, further comprising a compressor fluidly connected to the left and right air suspensions via valves, the controller configured to:

raise the left and right air suspensions by operating the valves to supply compressed air from the compressor; and lower the left and right air suspensions by exhausting air therefrom.

7. The recreational vehicle of claim 6, further comprising an offboard port fluidly coupled to the compressor.

8. The recreational vehicle of claim 6, further comprising:

left and right tires fluidly coupled to the compressor via valves; and tire pressure monitoring sensors, wherein the controller is configured to selectively inflate the left and right tires by operating the valves to supply compressed air from the compressor and/or deflate the left and right tires.

9. The recreational vehicle of claim 1, further comprising a warning light visible to a user, the controller configured to illuminate the warning light in response to identifying a fault in operation.

10. The recreational vehicle of claim 1, further comprising a system interface comprising a user input allowing a user to instruct the control the system to level the recreation vehicle.

11. A method for operating a recreational vehicle, the method comprising:

performing a leveling operation including:

lowering left and right air suspensions to a low setting, the left and right air suspensions operably coupled between a frame and wheels of the recreational vehicle;

leveling the left and right air suspensions to level the recreational vehicle along a lateral axis;

operating a front jack of the recreational vehicle until the recreational vehicle is level along a longitudinal axis.

12. The method of claim 11, wherein performing the leveling operation comprises performing a leveling operation with a controller based on data from a tilt sensor.

13. The method of claim 11, wherein lowering the left and right air suspensions to the low setting comprises lowering the left and right air suspensions to a lowest set pressure or height.

14. The method of claim 11, wherein leveling the left and right air suspensions to level the recreational vehicle along the lateral axis comprises:

determining a lower one of the left and right air suspensions of the recreational vehicle relative to a horizontal plane; and raising the lower one of the left and right air suspensions until the recreational vehicle is level along the lateral axis.

15. The method of claim 11, further comprising raising the left and right air suspensions to level the recreational vehicle along the longitudinal axis in response to determining that a lowest setting of the front jack does not level the recreational vehicle along the longitudinal axis.

16. The method of claim 11, further comprising lowering one or more stabilizers to lock the attitude of the recreational vehicle with the recreational vehicle level along the lateral and longitudinal axes.

17. The method of claim 16, further comprising performing a support retraction operation including retracting the one or more stabilizers to a storage position.

18. The method of claim 17, wherein the support retraction operation further includes raising at least one of the left and right air suspensions or the front jack a level sufficient to lower or remove a force applied to the stabilizers due to the stabilizers supporting the recreational vehicle.

19. The method of claim 17, wherein the support retraction operation further includes at least one of:

setting the left and right suspensions to a desired ride height for travel; or raising the front jack to a hitch height.

20. A method for operating a recreational vehicle, the method comprising:

performing a leveling operation including:

determining a higher one of left and right air suspensions of the recreational vehicle relative to a horizontal plane, the left and right air suspensions operably coupled between a frame and wheels of the recreational vehicle;

lowering the higher one of the left and right air suspensions until the recreational vehicle is level along a lateral axis; and operating a front jack of the recreational vehicle until the recreational vehicle is level along a longitudinal axis.

21. The method of claim 20, wherein performing the leveling operation comprises performing a leveling operation with a controller based on data from a tilt sensor.

22. The method of claim 20, wherein performing the leveling operation further comprises first moving the left and right air suspensions and the front jack to preset levels.

23. The method of claim 20, further comprising, after the recreational vehicle is leveled along the lateral axis, lowering the attitude of the recreational vehicle by lowering both the left and right air suspensions.

24. The method of claim 23, wherein lowering the attitude of the recreational vehicle comprises lowering the left and right air suspensions until the recreational vehicle is at a lowest possible level attitude corresponding to one or both of the left and right suspensions bottoming out.

25. The method of claim 20, further comprising raising the left and right air suspensions to level the recreational vehicle along the longitudinal axis in response to determining that a lowest setting of the front jack does not level the recreational vehicle along the longitudinal axis.

26. The method of claim 20, further comprising lowering one or more stabilizers to lock the attitude of the recreational vehicle with the recreational vehicle level along the lateral and longitudinal axes.

27. The method of claim 26, further comprising performing a support retraction operation including retracting the one or more stabilizers to a storage position.

28. The method of claim 27, wherein the support retraction operation further includes raising at least one of the left and right air suspensions or the front jack a level sufficient to lower or remove a force applied to the stabilizers due to the stabilizers supporting the recreational vehicle.

29. The method of claim 27, wherein the support retraction operation further includes at least one of:
 setting the left and right suspensions to a desired ride height for travel; or
 raising the front jack to a hitch height.

* * * * *